Sept. 29, 1959   O. M. LEWIS   2,906,322
CIRCUMFERENTIALLY TRAVELING TYPE TIRE MOUNTING DEVICE
Filed Feb. 18, 1957   3 Sheets-Sheet 1
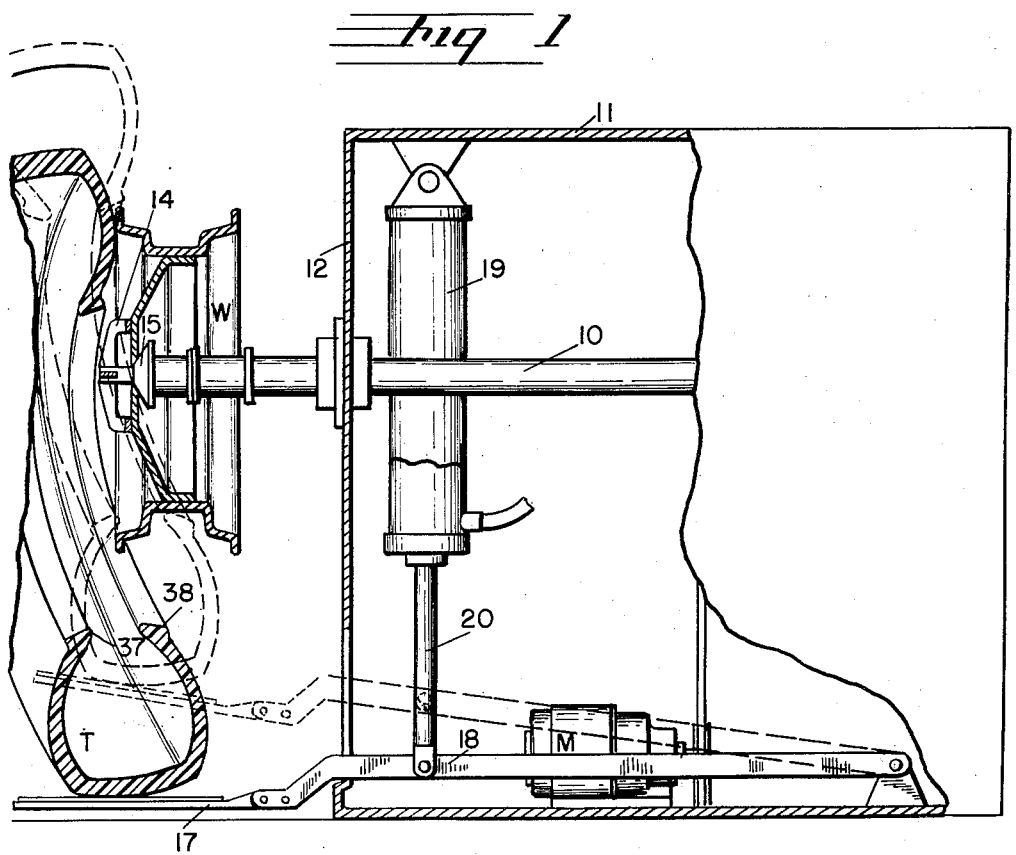
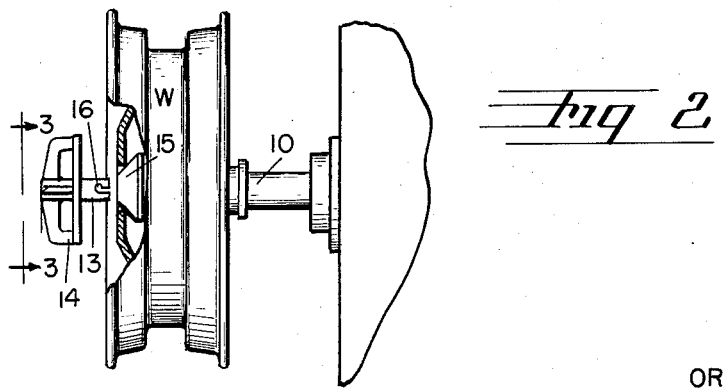
INVENTOR.
ORVAL M. LEWIS
BY
ATTORNEY Sept. 29, 1959     O. M. LEWIS     2,906,322
CIRCUMFERENTIALLY TRAVELING TYPE TIRE MOUNTING DEVICE
Filed Feb. 18, 1957     3 Sheets-Sheet 2
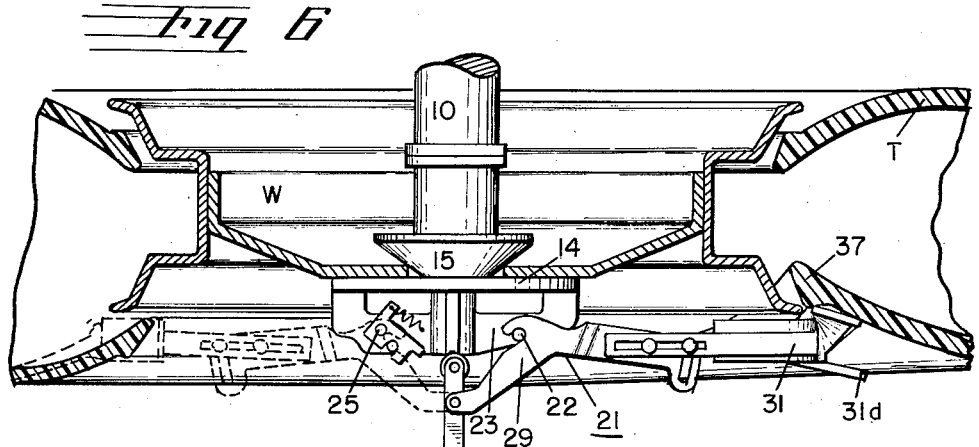
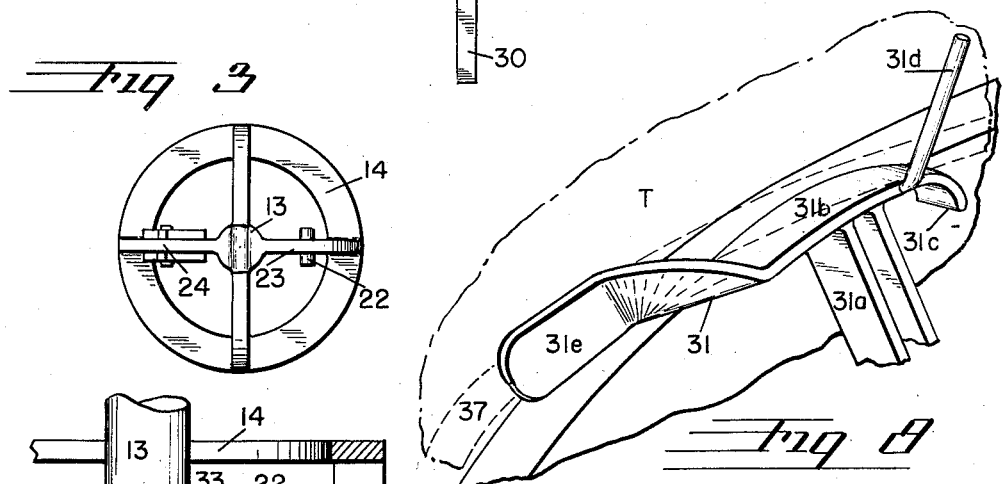
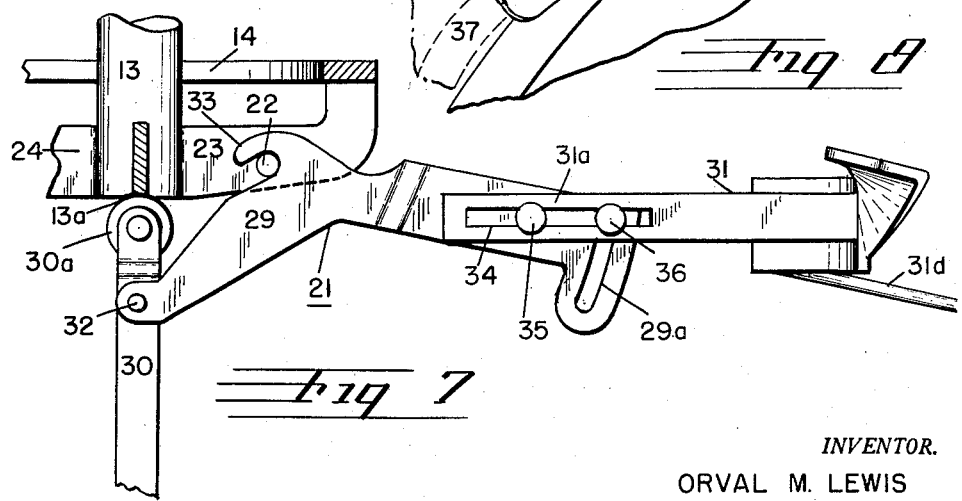
INVENTOR.
ORVAL M. LEWIS
BY
ATTORNEY Sept. 29, 1959    O. M. LEWIS    2,906,322
CIRCUMFERENTIALLY TRAVELING TYPE TIRE MOUNTING DEVICE
Filed Feb. 18, 1957    3 Sheets-Sheet 3

INVENTOR.
ORVAL M. LEWIS
BY
ATTORNEY

United States Patent Office 2,906,322
Patented Sept. 29, 1959

2,906,322

CIRCUMFERENTIALLY TRAVELING TYPE TIRE MOUNTING DEVICE

Orval M. Lewis, Sweet Home, Oreg.

Application February 18, 1957, Serial No. 640,926

3 Claims. (Cl. 157—1.24)

The present invention relates to means for mounting a vehicle wheel tire in place on the wheel rim, especially tires of trucks, buses, or other heavy duty vehicles, including aeroplane landing gear wheels, and, in particular, the modern tubeless tires which have been found to be even more troublesome and difficult for mounting in place on the wheel rims.

In general, heretofore the larger and heavier the tire the greater has been the amount of time and labor required for mounting the same on the vehicle wheel rim. The principal object of this invention is to provide novel and practical means by which any vehicle tire, of any size and weight within the customary range of vehicle wheel tires, can be easily and quickly mounted in place on the wheel rim for which it is intended.

A related object of the invention is to provide a novel tire mounting device which will enable a single operator to perform the tire mounting operation without undue physical effort, regardless of the size of the tire.

Another object of the invention is to provide a tire mounting device which, although performing the desired tire mounting operation quickly, and to a large extent, mechanically, will do so without any possibility of injury to the tire.

An additional object of the invention is to provide a tire mounting device which will be simple and practical in construction, and the operation and maintenance of which will not involve any appreciable expense or necessitate the use of more than ordinary skill.

In some respects, the device for the present invention resembles the "Roller Type Device for Removing a Tire from a Vehicle Wheel," described in my United States Letters Patent No. 2,767,781, issued Oct. 23, 1956, to which reference is made, and the two devices are intended as companion devices performing the opposite tasks of mounting and demounting a tire, with the work, in each case, being performed quickly and easily.

The manner in which the device of the present invention attains the above objects, and the manner in which the present improved mounting device is constructed and operated, will be briefly described and explained with reference to the accompanying drawings, wherein:

Figure 1 is a fragmentary sectional elevation showing the device at the beginning of the operation of mounting a tire, the full lines showing the first position of the tire and the broken lines showing the position into which the tire is immediately moved for mounting;

Figure 2 is a side elevation showing the means by which the wheel is first secured on the device preparatory to the mounting of the tire on the wheel;

Figure 3 is an enlarged front elevation of the wheel-holding means, this view being taken on line 3—3 of Fig. 2;

Figure 4:
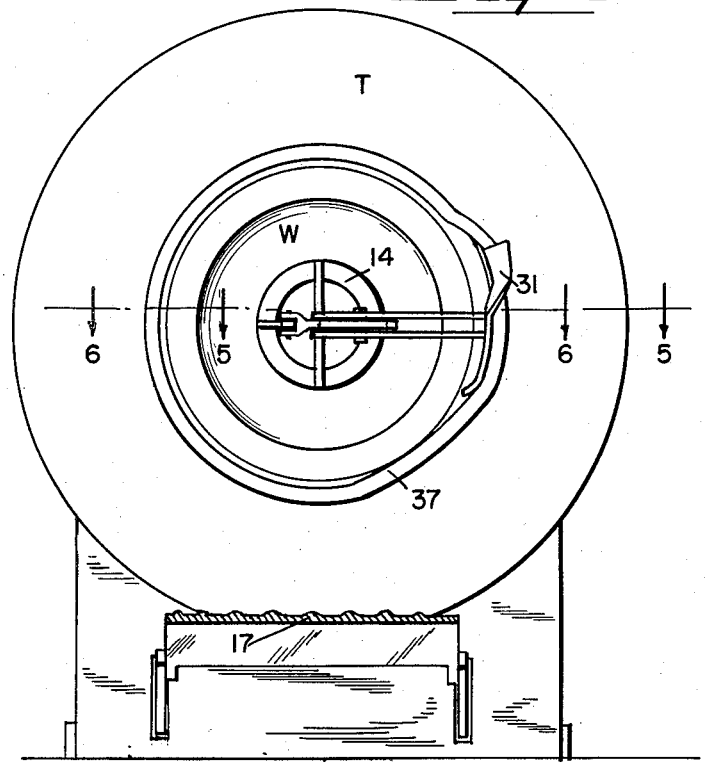
Figure 4 is a front elevation, taken from the left of Fig. 1, showing the tire in the position indicated by the broken lines in Fig. 1 and with the tire bead-thruster attached to the wheel-holding means.

Figure 6 similarly is an enlarged fragmentary plan section on line 6—6 of Fig. 4, showing the tire bead-thruster moved into final engaging position with the tire rim;

Figure 7 is an enlarged plan view of the tire bead-thruster by itself, illustrating the same in the full or final bead-thrusting position; and Figure 8 is a fragmentary perspective view of the tire-engaging end of the bead-thruster, showing the shape of the bead-thruster and illustrating the manner in which it engages the tire bead for the purpose of thrusting the same inwardly over the outer rim of the wheel.

In Fig. 1, a horizontal shaft 10 is rotatably mounted in a support housing 11, and extends out beyond the front wall 12 of the housing. This shaft is rotated by a motor M through the medium of a suitable pulley and belt connection (not shown). A push button control switch (not shown) is mounted in a convenient location on the outside of the housing.

The shaft 10, or at least the outer end of it, is hollow and is adapted to receive telescopically a center hollow stub shaft 13 (Figs. 2 and 3) of a wheel-holding ring 14, which holding-ring is adapted to engage the outside face of the hub portion of the vehicle wheel W and hold the wheel on the shaft 10 while the wheel rests against a flange 15 on the end of the shaft 10. A pair of notches, the outer end of one of which is indicated at 16 in Fig. 2, are formed in end of the stub shaft 13 and are so arranged as to be capable of locking engagement with a bar (not shown) extending diametrically through the shaft 10 so as to provide a bayonet type of locking means for maintaining the holding-ring 14 in place and thus keeping the vehicle wheel W held in position on the end of the shaft 10. This holding-ring 14 will be described more fully later.

The device (Fig. 1) is provided with a tire hoisting platform 17, mounted on the end of a lever arm 18. A hydraulic cylinder 19 is suspended within the housing 11, as shown in Fig. 1, and carries a piston 20 which is pivotally connected with the lever arm 18. The operation of the hydraulic cylinder and piston is governed by a suitable control (not shown), conveniently located on the outside of the housing 11. The platform 17 at first is in the low position, as shown in full lines in Fig. 1, and in this lower position is substantially at floor level, so that the tire T can be easily rolled onto the platform and thus into the full line position illustrated in Fig. 1. Then the platform 17 is raised in order to lift the tire substantially into the broken line position shown in Fig. 1. The top face of the platform 17 preferably is formed with ridges or other protrusions in order to aid in holding the tire against rotation while it is supported on the platform, as later referred to.

The wheel W on which the tire T is to be mounted, if light in weight, may be manually set on the end of shaft 10 before the tire is rolled onto the platform 17. But if the operator prefers, the wheel can first be rolled onto the platform 17 and held tilted slightly forward on the platform, and the platform then raised until the wheel is high enough to be pushed into place on the end of the shaft 10, whereupon the platform 17 is lowered to receive the tire, as previously mentioned.

When the wheel W has been mounted on the end of the shaft 10 and the wheel-holding ring 14 has been set in place, as previously described, and after the tire T has been rolled onto the platform 17 and the tire has then been raised for the full line position to the broken line position of Fig. 1, the tire bead thruster assembly, indicated as a whole by the reference character 21 (see Fig. 5), is then attached to the wheel-holding ring 14.

Figure 5:
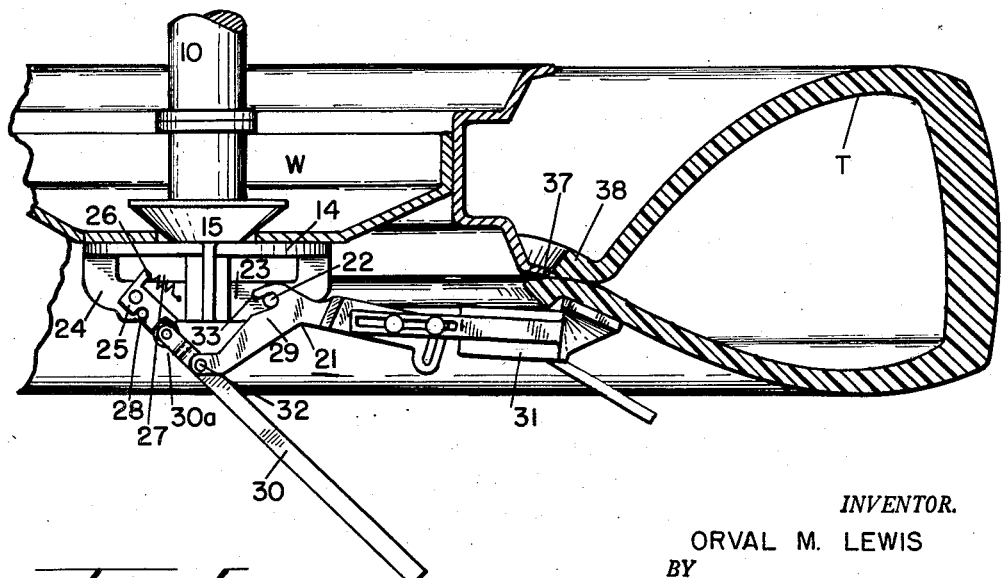
Figure 5 is a fragmentary plan section on line 5—5 of Fig. 4 drawn to an enlarged scale.

The wheel-holding ring 14 is formed with pairs of aligned radial ribs. A pin 22 (Figs. 3 and 5) extends through one of the ribs 23, and the opposite rib 24 carries a pivotally mounted engaging element 25 comprising a pair of parallel identical side portions which are located on opposite sides of the rib 24 respectively and which have concaved outer ends. These side portions are joined by a U-shaped integral connecting portion 26 (Fig. 5). A spring 27 holds the engaging element 25 normally in the position illustrated in Fig. 5 and thus in contact with a limit stop pin 28.

The tire bead-thruster 21 (Figs. 5 and 7) consists of a middle member 29, an operating lever 30, and an adjustable tire bead contact member 31. The inner end of the operating lever 30 is bifurcated and a broad roller 30a is mounted on this end. The middle member 29 has a bifurcated end which straddles the operating lever 30 and which carries a pin 32 on which the lever 30 is pivotally mounted. This middle member 29 has also a bifurcated hook portion 33, which straddles the rib 23 of the wheel-holding ring 14 and engages the ends of the pin 22. The tire contact member 31 has a bifurcated stem 31a which straddles the outer end of the middle member 29, as shown most clearly in Fig. 7. Each of the two sides of the bifurcated stem 31a carries a longitudinal slot, one of these slots being shown at 34 in Fig. 7. The outer end of the middle member 29 is extended on one side and this outer end is provided with a curved slot 29a. A pair of bolts 35 and 36, which pass through these slots, as illustrated, adjustably secure the tire contact member 31 on the middle member 29.

The portion of the tire contact member 31 which actually engages the tire consists of a specially designed plow-shaped runner and guide, the preferred form of which is shown best in Fig. 8, and the purpose of which is to engage and position the outer bead 37 of the tire T. This tire bead contacting portion includes a curved saddle runner 31b, which is adapted to move along on the periphery of the tire bead 37 while thrusting it radially outwardly. The forward end of this runner is curved downwardly or inwardly radially as shown at 31c, to enable the runner to engage and pass easily and smoothly along the tire bead. This runner is also provided with a handhold 31d, to enable the operator to set the tire bead-thruster in position on the tire bead at the start, and to hold it in position temporarily. At the rear end, the saddle runner 31b is given a 90° twist, which results in forming the thrusting end portion 31e which is adapted to bear against the outside face of the outer bead 37 of the tire and to push the engaged portion of the tire bead further inwardly towards the wheel.

The operation of the device can now be described more fully. With the wheel W mounted on the end of shaft 10 and held thereon by the holding ring 14, and with the tire T resting on the platform 17, the platform having been raised until the inner bead 38 of the tire is firmly pressed against the inner well or groove of the wheel periphery at the bottom (as illustrated by the broken lines in Fig. 1), and with the remainder of the tire positioned in front of wheel W, the operator attaches the tire bead-thruster assembly 21 to the holding ring 14, as illustrated in Fig. 5. In this position the roller 30a on the inner end of the hand lever 30 engages the concave outer ends of the companion side members of the pivotally mounted engaging element 25, while the bifurcated hook portion 33 engages the ends of the pin 22. The operator then starts the motor M, causing the shaft 10 to rotate slowly and with it the ring 14 and the tire bead-thruster assembly 21. The raising of the tire by the hoisting platform 17 bringing the inner bead of the tire into contact with the groove of the wheel periphery at the bottom accomplishes two important purposes; it prevents the tire rotating while the shaft 10 and bead-thruster assembly are rotated, and, by bringing the inside lead 38 of the tire up into the bottom portion of the peripheral groove of the wheel, it enables the remaining portion of the inner bead 38 of the tire to be pushed readily over the outer rim of the wheel. Thus, as the shaft 10 and bead-thruster assembly 21 start rotating while the tire is held against rotation, one rotation of the bead thruster assembly with the bead-thruster in the position shown in Fig. 5 causes the remainder of the inside bead 38 of the tire to be pushed over the outer rim flange of the wheel.

The operator then moves the lever 30 of the bead-thruster assembly 21 from the position of Fig. 5 to the final position shown in Figs. 6 and 7, causing the roller 30a of the lever 30 to rest in a center groove 13a on the outer end of the stub shaft 13 of the wheel-holding ring 14 and bringing the lever 30 into alignment with the shaft 10. This forces the tire contact member 31 of the bead-thruster assembly 21 rearwardly with respect to the adjacent outer flange of the wheel. As a result, a second rotation of the shaft 10 and bead-thruster assembly 21 now acts to thrust the outer bead 37 of the tire over the outer flange of the wheel, and, at the end of this second rotation of the bead-thruster assembly 21, the mounting of the tire on the wheel will be complete. The tire bead-thruster assembly is then removed from the holding ring 14; the holding ring 14 is removed from the shaft 10; the wheel with the tire mounted thereon is tilted forwardly sufficiently to disengage the wheel hub from the end of shaft 10; and the platform 17 is lowered to ground level to permit the wheel with the tire thereon to be rolled away.

It will be evident from this description of operation that the entire operation of mounting the tire on the wheel requires only a few minutes at the most and that very little physical effort is required on the part of the operator, since he is not obliged to lift the tire, or even to lift the wheel if he does not wish to do so, and since the mounting of the tire bead-thruster assembly in place and the setting of the tire contact member of the same into engaging position, and then the moving of the lever 30 into its final position into alignment with the shaft 10, will not involve very much labor or any great amount of physical exertion.

In order to facilitate the sliding of the tire contact member 31 of the tire bead thruster assembly 21 around the outside face of the tire and bead, especially in the case of heavy, stiff tires, and also, incidentally, to prevent wear on the tire by the member 31, the engaged outer face of the tire and the tire bead may, if desired, be first lubricated with a suitable lubricant (such as a grease having a vegetable base), which lubricant has no detrimental effect on the rubber or any other material of which the tire is composed. The using of such lubricant considerably eases and facilitates movement of the bead thruster around the tire, especially during the final thrusting of the outer bead of the tire over the adjacent wheel rim.

The tire bead thruster assembly 21 illustrated can readily be adjusted for tires of different sizes and for differently formed wheel flanges, or for different types of tire beads, as will be apparent from Fig. 7. Also, tire contact members of different sizes and shapes may be substituted for the contact member 31 on the tire bead thruster assembly 21. The particular contact member 31 which has been illustrated and described has been found to be most efficient for use with large tires, and particularly in the case of large "tubeless" tires. In the case of smaller tires, as for example, tires for passenger automobiles, smaller contact members can also be used very satisfactorily.

It would be possible to make additional minor modifications in the tire mounting device of the present invention without departing from the principle of the same, but the device in the form illustrated and described I consider to be the preferred form for the carrying out of the invention. It is not intended to limit the scope of the invention, however, except as set forth in the claims.

I claim:

1. In a tire mounting device of the character described including a substantially horizontal shaft for supporting the vehicle wheel on which the tire is to be mounted and an elevating platform for raising the tire into desired engagement with said wheel, a wheel abutment and centering means on said shaft a member removably secured on the end of said shaft and retaining said wheel against the abutment on said shaft, means for rotating said shaft and therewith said member, a tire bead guiding and thrusting assembly secureable on said member for rotation with said member, a tire bead contact element secured on said thrusting assembly, and manually operable means in said assembly for positioning said tire bead contact element further inwardly over the adjacent rim of said wheel during the tire mounting operation, whereby, when said tire is raised into engagement with said wheel with a portion of the inner bead of said tire held in the well of the wheel rim and said tire bead contact element engages the outer bead of said tire, the rotation of said assembly will first cause the remaining portion of said inner bead to be pushed over the adjacent rim flange and the subsequent positioning of said tire bead contact element further inwardly by said means will then cause said outer bead to be pushed over said rim flange.

2. In a tire mounting device including a substantially horizontal shaft for supporting the wheel on which the tire is to be mounted, means for raising a tire into desired engagement with the wheel on said shaft and for holding the tire against rotation, a wheel abutment and centering means on said shaft a member removably mounted on the end of said shaft and retaining said wheel against the abutment on said shaft, means for locking said member to said shaft, means for rotating said shaft and therewith said member, a tire bead guiding and thrusting assembly removably attached to said member for rotation with said member, a tire bead contact element adjustably secured on said thrusting assembly, and lever means in said assembly for positioning said bead contact element further inwardly over the adjacent rim flange of said wheel during the tire mounting operation, whereby, when said tire is raised into engagement with said wheel with a portion of the inner bead of said tire held in the well of the tire rim and said tire bead contact element engages the outer bead of said tire, the rotation of said assembly will first cause the remaining portion of said inner bead to be pushed over the adjacent rim flange and the subsequent positioning of said tire bead contact element further inwardly by said lever means will then cause said outer bead to be pushed over said rim flange.

3. A tire mounting device comprising a substantially horizontal shaft for supporting the vehicle wheel on which the tire is to be mounted, means for raising a tire into desired engagement with the wheel on said shaft and for holding the tire against rotation, a wheel abutment and centering means on said shaft a member removably secured on the end of said shaft and retaining said wheel against the abutment on said shaft, means for rotating said shaft and therewith said member, a tire bead engaging and thrusting assembly removably attached to said member for rotation with said member, a curved saddle runner for engaging the tire bead adjustably secured on said thrusting assembly, a hand hold on said saddle runner, and manually operable means in said assembly for positioning said curved saddle runner further inwardly over the adjacent rim flange of said wheel during the tire mounting operation, whereby, when said tire is raised into engagement with said wheel with a portion of the inner bead of said tire held in the well of the wheel rim and said curved saddle runner engages the outer bead of said tire, the rotation of said assembly will first cause the remaining portion of said inner bead to be pushed over the adjacent rim flange and the subsequent positioning of said curved saddle runner further inwardly by said means will then cause said outer bead to be pushed over said rim flange.

References Cited in the file of this patent

UNITED STATES PATENTS

| | | |
|---|---|---|
| 2,378,955 | Teegarden | June 26, 1945 |
| 2,470,534 | Thomas | May 17, 1949 |
| 2,546,988 | Eberley | Apr. 3, 1951 |
| 2,569,788 | Weaver | Oct. 2, 1951 |
| 2,655,985 | Henderson | Oct. 20, 1953 |
| 2,767,781 | Lewis et al. | Oct. 23, 1956 |